April 15, 1947.  J. F. RALEIGH  2,418,954
PLOW JOINTER
Filed Feb. 2, 1945  3 Sheets-Sheet 1
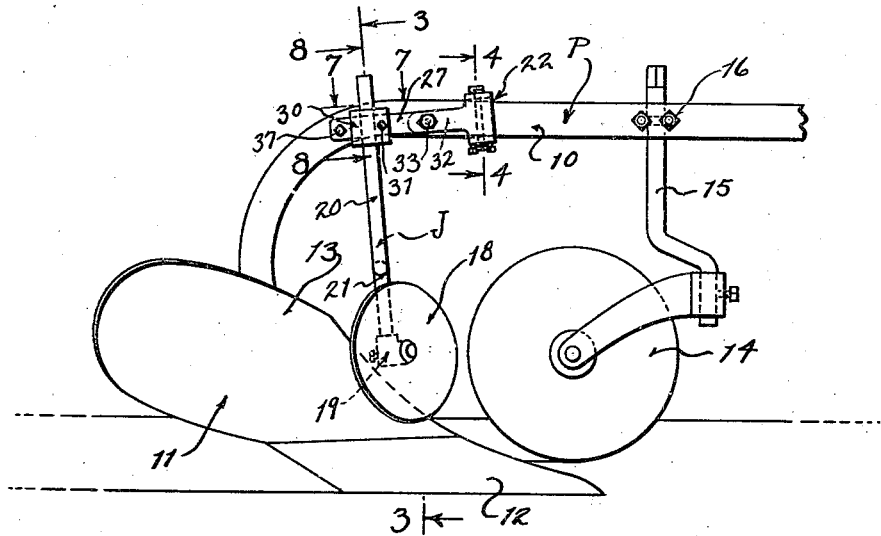
Fig. 1.
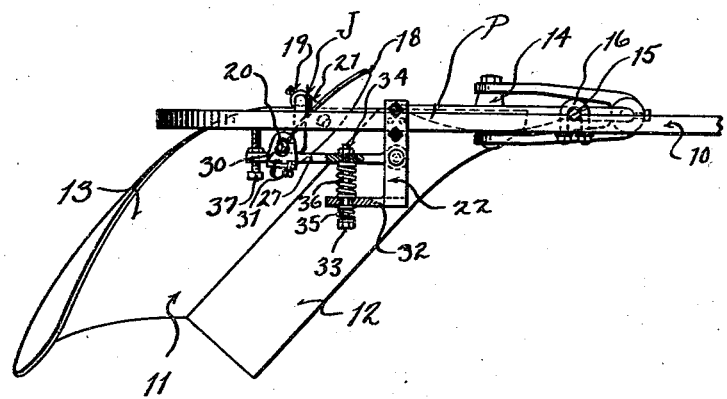
Fig. 2.
INVENTOR
JOHN F. RALEIGH
BY
ATTORNEYS April 15, 1947.  J. F. RALEIGH  2,418,954
PLOW JOINTER
Filed Feb. 2, 1945  3 Sheets-Sheet 2
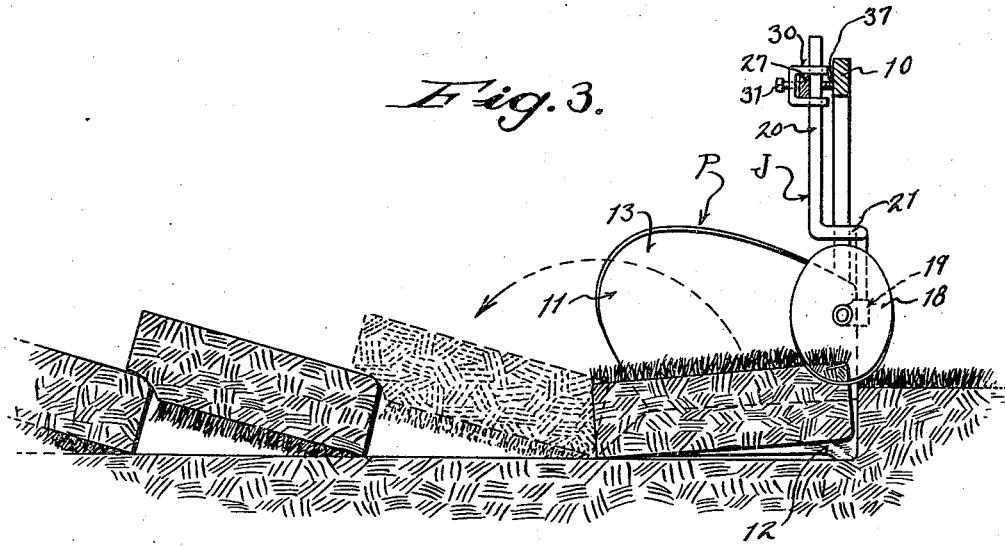
Fig. 3.
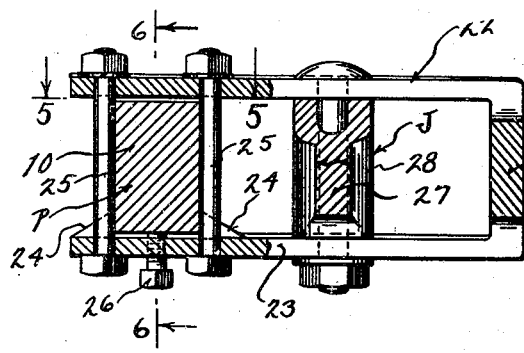
Fig. 4.
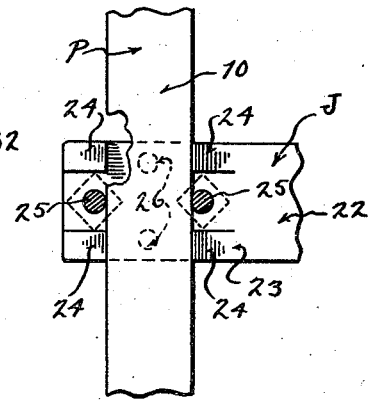
Fig. 5.
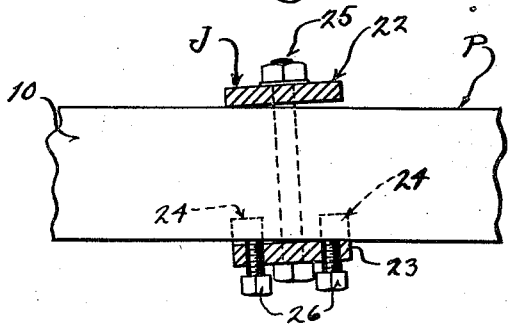
Fig. 6.
INVENTOR
JOHN F. RALEIGH
BY
ATTORNEYS

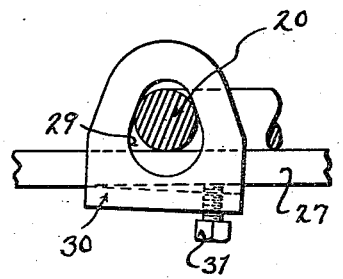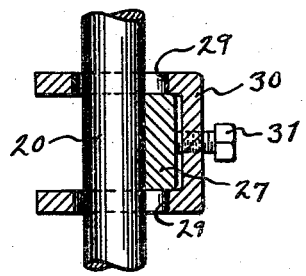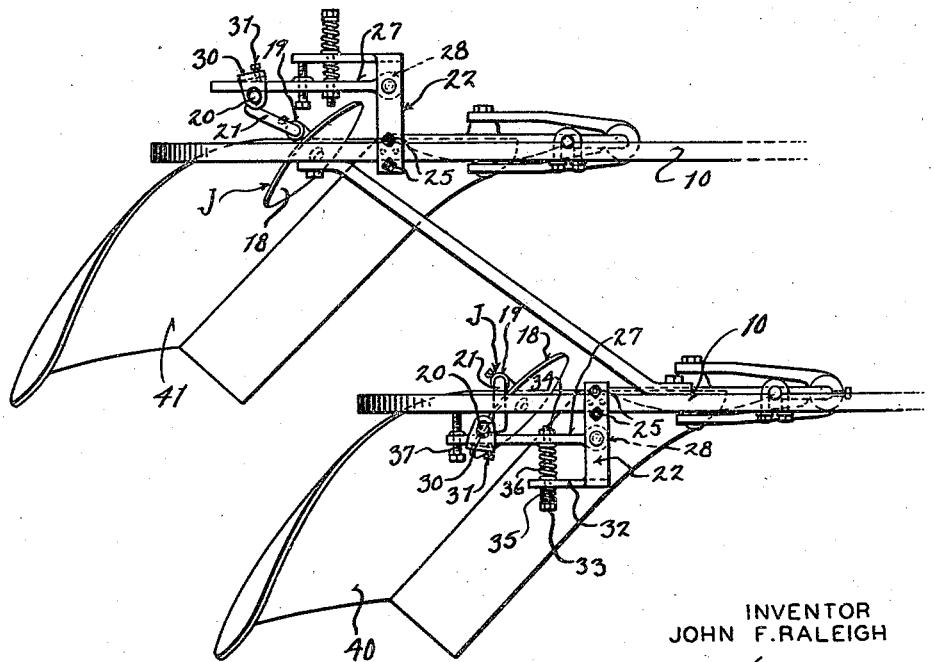

Patented Apr. 15, 1947

2,418,954

UNITED STATES PATENT OFFICE 2,418,954

PLOW JOINTER

John F. Raleigh, Peshtigo, Wis.

Application February 2, 1945, Serial No. 575,761

4 Claims. (Cl. 97—210)

This invention appertains to plows and more particularly to a novel disc plow jointer.

The usual types of plow jointers are open to many objections and difficulty is experienced in drawing the plow through the ground due to the drag set up by the jointer on the plow slice. Further, the ordinary types of jointers become clogged with dirt and debris and need attention in order that a desired cut on the plow slice will be had.

It is therefore one of the primary objects of my invention to provide a plow jointer which is located in rear of the coulter and directly alongside of the front of the mold board whereby the jointer will effectively engage the plow slice as the slice is initially raised during the drawing of the plow through the ground.

Another important object of my invention is to provide a plow jointer embodying a rolling disc with means for effectively supporting the disc at an angle to the land side of the plow so that the disc jointer will effectively trim and cut off the trash corner of the plow slice.

A further object of my invention is to provide a self-cleaning rolling plow jointer, the construction of the jointer and its support being such that the jointer can move laterally of the plow mold board when stones and the like are encountered, whereby danger of breakage of the jointer and other parts is eliminated.

A further important object of my invention is to provide novel means for supporting the disc jointer from the plow beam, whereby the jointer can be accurately set and adjusted relative to the plow to suit plowing conditions.

A still further object of my invention is to provide a novel disc plow jointer and support therefor, which will be durable and efficient in use, one that will be simple and easy to manufacture and one which can be placed upon the market at a reasonable cost.

With these and other objects in view the invention consists in the novel construction, arrangement and formation of parts, as will be hereinafter more specifically described, claimed, and illustrated in the accompanying drawings, in which drawings:

Figure 1 is a side elevational view of a plow showing my novel plow jointer incorporated therewith and illustrating the position of the jointer relative to the rolling coulter and the plow share and mold board.

Figure 2 is a top plan view showing my jointer incorporated with a plow, parts of the view being shown broken away and in section.

Figure 3 is a transverse sectional view taken substantially on the line 3—3 of Figure 1, looking in the direction of the arrows, the view illustrating the operation of the jointer and showing the plow slice cut by the jointer.

Figure 4 is an enlarged fragmentary detail sectional view taken on the line 4—4 of Figure 1, looking in the direction of the arrows illustrating the primary support for the jointer beam.

Figure 5 is a detail horizontal sectional view taken on the line 5—5 of Figure 4 looking in the direction of the arrows, showing the means for connecting the main supporting bracket for the jointer with the plow beam.

Figure 6 is a sectional view taken at right angles to Figure 4 and substantially on the line 6—6 of Figure 4 illustrating the means for adjusting the position of the primary bracket on the plow beam.

Figure 7 is a detail horizontal sectional view taken on the line 7—7 of Figure 1 looking in the direction of the arrows showing the means for connecting the jointer standard with the jointer beam.

Figure 8 is a detail sectional view taken substantially on the line 8—8 of Figure 1 looking in the direction of the arrows and showing the means of connecting the jointer standard with the jointer beam.

Figure 9 is a top plan view showing my arrangement for connecting the jointers with a multiple bottom plow.

Referring to the drawings in detail, wherein similar reference characters designate corresponding parts throughout the several views, the letter J generally indicates my novel jointer which can be used with a plow P.

The plow P can be considered of any preferred make and includes the usual plow beam 10 having a plow bottom 11. The plow bottom includes the point and share 12 and the mold board 13.

The plow beam 10 also carries the rolling coulter 14 and this coulter is connected to a standard 15, which is in turn fastened by means of a U-bolt 16 to the beam 10. The coulter functions in the usual manner and rides in front of the plow bottom to cut the debris and the earth ahead of the plow.

My improved jointer J includes a concavo-convexed disc 18 and this disc 18 is of a smaller size than the coulter 14. The axial center of the disc is rotatably carried by a bearing 19 which is in turn adjustably connected to a standard 20. The standard 20 is provided with an offset lower end 21 to which is secured the bearing for said jointer disc. The standard 20 is carried by the plow beam 10 in a novel manner, as will now be described. It is to be noted, however, that my disc jointer 18 is located in rear of the coulter directly above the share 12 and alongside of the mold board 13 and is disposed at an angle to the land side of the plow.

The support for the standard 20 embodies a primary supporting bracket 22 and this bracket is of a substantially U-shape when viewed in front elevation. The arms 23 of the bracket extend transversely across the plow beam 10 in rear of the coulter and one of the arms 23 can be provided with lugs 24 for engaging the opposite sides of the plow beam so as to prevent movement of the bracket across the beam. Bolts 25 connect the arms 23 together on opposite sides of the beam and serve to clamp said arms to the beam. It is to be noted, however, that the lower arm carries set screws 26 which are threaded into said arm on opposite sides of the longitudinal axis of the arm. Obviously, by adjusting the screws up and down the bracket can be tilted to a desired angle (see Figure 6) so that the standard 20 and the jointer disc 18 can be positioned at a desired angle relative to the mold board. The standard 20 of the jointer is carried by a short jointer beam 27, the forward end of which terminates in a knuckle or bearing sleeve 28. This bearing sleeve is received between the arms 23 of the bracket 22 at one side of the plow beam 10 and the jointer beam is adapted to extend along the plow beam in spaced relation thereto toward the mold board 13. Hence, the jointer beam 27 is free to rock toward and away from said plow beam. The upper end of the standard extends through keyhole shaped opening 29 in a U-shaped supporting bracket 30 and this bracket embraces the jointer beam 27. The bight portion of the supporting bracket 30 carries an adjustable screw 31 (see Figures 7 and 8) and by adjusting the screw the standard 20 can be wedged in the openings 29 tight against the jointer beam. This will effectively hold the jointer in place. Obviously, by loosening the screw 31 the standard 20 and consequently the jointer disc can be raised or lowered, moved forward or backward on beam 27 to any position necessary for deep or shallow plowing and adjusted to any angle necessitated by different soil conditions.

Formed on the bight portion of the main or primary bracket 22 is a rearwardly extending arm 32. This arm extends in spaced relation to the jointer beam and loosely carries a tension member. The tension member includes a headed bolt 33 which loosely extends through an opening in the arm 32. This bolt in turn extends through the jointer beam 27 and is held in place by a nut 34. Springs 35 and 36 are coiled about the bolt on opposite sides of the arm 32 and are of such a tension that the beam 27 is normally urged toward the plow beam 10. An adjustable stop 37 can be carried by the end of the jointer beam for engagement with the plow beam to limit the inward swinging movement of said jointer beam.

The spring 36 is a low tension spring and functions to merely hold the jointer beam 27 and the jointer disc 18 close to its working position. When the jointer disc 18 engages the furrow slice and is forced into its working position by the pressure of the ground against the disc, this compresses the spring 35, which in turn helps to move the disc out of its working position to allow obstruction to move more freely between the jointer disc and the mold board. With the two coil springs 35 and 36 instead of a leaf spring a slot is made where the bolt 33 goes through the jointer beam 27 to keep it from binding. Under some plowing conditions spring 35 could be eliminated. Where bracket 22 is extended from the left side of the plow beam (see Figure 9), the spring outside of arm 32 would be the low tension spring and the spring between the arm 32 and the jointer beam 27 would be a high tension spring.

The jointer disc 18 is adjusted relative to the particular style of plow with which the same is associated and from the above description it can be seen that the jointer beam can be tilted on the plow beam and that the standard of the jointer can be raised and lowered. Likewise the jointer 18 can be turned about its standard through the medium of the bearing 19. By referring to Figures 1, 2 and 3 it can be seen that the jointer disc 18 extends at an angle to the land side of the plow at the front of the mold board and consequently as the plow is drawn through the ground the plow slice will be engaged by the jointer disc and the upper inner corner (trash edge) of the plow slice will be effectively cut off. As the plow slice is turned this trimmed off corner will rest on the adjacent corner of a turned plow slice. This permits the effective settling of the plow slices relative to one another. If trash collects between the mold board and the jointer disc or a hard object is encountered, the disc 18 will automatically move away from the mold board due to its tension connection with the arm 32.

With my arrangement of disc jointer I have found that the plow can be easily drawn through the ground and the accumulation of trash and the like is avoided.

In Figures 1 to 8, inclusive, I have shown my jointer connected with a single bottom plow but obviously the jointer can be effectively used with multiple bottom plows. In Figure 9, I have shown a plow embodying two plow bottoms 40 and 41. My plow jointer is connected with the outermost plow 40 in the same manner as described for the single bottom plow. For the inner plow 41 the primary bracket 22 is bolted to the plow beam so that the same will project in the opposite direction from the jointer bracket for the plow 40. It is merely necessary to swing the standard 20 for the jointer under the plow beam for the plow 41 as is clearly shown in Figure 9.

Various changes can be made in detail without departing from the spirit or the scope of my invention, but what I claim as new is:

1. The combination with a plow including a beam, a plow bottom having a share, a mold board and a land side, and a rolling coulter carried by the plow beam, of a jointer including a rotatable disc arranged between the plow bottom and the coulter, a support for said disc including a bracket secured to the plow beam, a jointer beam rockably carried by the bracket and a standard secured to the jointer beam, spring means normally urging the disc and standard toward the mold board, and a stop for limiting the swinging movement of the disc and standard toward the mold board.

2. The combination with a plow including a beam, a plow bottom having a share, a mold board and a land side, and a rolling coulter carried by said beam, of a jointer including a rotatable disc disposed between the coulter and the mold board, said disc being arranged at an angle to the land side and directly at the front of said mold board, a support for said disc including a bracket, means for angularly adjusting the bracket on the beam, a jointer beam rockably carried by the bracket movable toward and away from the first beam, a supporting bracket adjustable along the jointer beam, a standard vertically adjustable in the supporting bracket, means rotatably connecting the disc to the standard, means normally urging the jointer beam, standard and disc toward the plow, and means for limiting the inward movement of said disc.

3. In a plow including a pair of spaced parallel beams and a plow bottom carried by each beam, a rolling coulter carried by each beam and each plow bottom, and a jointer for each plow bottom including brackets attached to the plow beams and extending in opposite directions, a jointer beam pivotally carried by each bracket for swinging movement, a standard carried by each jointer beam and projecting toward the leading edge of the mold board of the plow bottom, a jointer disc carried by each standard for turning movement, means resiliently urging each jointer beam and disc toward an adjacent plow bottom, and means limiting the swinging movement of each jointer beam and disc toward its adjacent plow bottom.

4. The combination with a plow including a beam and a plow bottom having a share, a moldboard and a landside; of a jointer including a rotatable disc arranged in front of the plow bottom and at an angle to the landside and directly at the front of said moldboard, a support for said disc including a bracket secured to the plow beam, a jointer beam rockably carried by the bracket and a standard secured to the jointer beam, spring means normally urging the disc and standard toward the moldboard, and means for limiting the swinging movement of the disc and standard toward the moldboard.

JOHN F. RALEIGH.

REFERENCES CITED

The following references are of record in the file of this patent:

UNITED STATES PATENTS

| Number | Name | Date |
|---|---|---|
| 607,743 | Haynes | July 19, 1898 |
| 1,038,036 | Weaver | Sept. 10, 1912 |